(12) United States Patent
Kawamura et al.

(10) Patent No.: US 6,893,490 B2
(45) Date of Patent: May 17, 2005

(54) INK FOR DISPLAY PANEL AND METHOD FOR PRODUCING PLASMA DISPLAY PANEL USING THE SAME

(75) Inventors: Hiroyuki Kawamura, Katano (JP); Keisuke Sumida, Hirakata (JP); Shigeo Suzuki, Hirakata (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 97 days.

(21) Appl. No.: 10/257,558

(22) PCT Filed: Apr. 16, 2001

(86) PCT No.: PCT/JP01/03226

§ 371 (c)(1),
(2), (4) Date: Oct. 11, 2002

(87) PCT Pub. No.: WO01/79361

PCT Pub. Date: Oct. 25, 2001

(65) Prior Publication Data

US 2003/0089275 A1 May 15, 2003

(30) Foreign Application Priority Data

Apr. 17, 2000 (JP) .............................. 2000-114865

(51) Int. Cl.$^7$ ............................................... C09D 11/00
(52) U.S. Cl. ................................ 106/31.64; 252/301.5; 252/301.4 R; 252/301.4 P; 252/301.4 S; 252/301.4 F; 252/301.4 H; 252/301.6 R; 252/301.6 P; 252/301.6 S; 427/66; 427/157
(58) Field of Search .......................... 106/31.64, 400; 427/66, 157; 252/301.4–301.6, 301.36, 520.3, 519.3, 519.32, 519.33; 501/17, 20

(56) References Cited

U.S. PATENT DOCUMENTS 6,100,633 A * 8/2000 Okumura et al. ........... 313/486

FOREIGN PATENT DOCUMENTS

| EP | 0 834 899 A2 | 4/1998 |
| JP | 08-162019 | 6/1996 |
| JP | PAJ 08-162019 | * 6/1996 |
| JP | 0 834 899 | * 9/1997 |
| JP | 09-237570 | 9/1997 |
| JP | 09-265833 | 10/1997 |
| JP | 10-130638 | 5/1998 |
| JP | 11-185636 | 7/1999 |
| JP | 11-202327 | 7/1999 |
| JP | 11-314936 | 11/1999 |
| JP | 11-345570 | 12/1999 |
| JP | 2000-011875 | 1/2000 |
| JP | 2000-011885 | 1/2000 |
| JP | 2000-268716 | 9/2000 |

* cited by examiner

*Primary Examiner*—C. Melissa Koslow
*Assistant Examiner*—Shalie A. Manlove

(57) ABSTRACT

An ink for a display panel that at a time of application is a mixture of a powder material, a water-soluble resin included in a range of 1 wt % to 20 wt % inclusive of the ink, and a water-miscible solvent. The ink is water-soluble, and in comparison to conventional organic inks, the ink of the present invention exhibits a markedly reduced susceptibility to the occurrence of electrostatic action. Thus, even when the ink is discharged through a plurality of fine nozzle holes, for example, it is possible for the application process to be conducted with great efficiency, since the individual ink flows discharged from the nozzle holes flow in a vertically downward direction without reacting with each other and becoming warped as a result. The ink of the present invention may, for example, be a phosphor ink, an Ag electrode ink, a shading film (black matrix) ink, a sealant glass ink, or a white reflective layer ink, and the ink may be used in forming structural layers of a display panel.

17 Claims, 4 Drawing Sheets ink flow

V3

800

700 warping caused by electrostatic action ink flow

V3

800

700 electrostatic action suppressed

INK FOR DISPLAY PANEL AND METHOD FOR PRODUCING PLASMA DISPLAY PANEL USING THE SAME

TECHNICAL FIELD

The present invention relates to an ink for a display panel, such as a phosphor ink, used in forming structural layers of a display panel, and to a method for manufacturing a plasma display panel using the ink.

BACKGROUND ART

The demand in recent years for further increases in the capacity of displays in areas such as image quality and screen size has lead to the development of a range of displays collectively referred to as flat panel displays (FPDs). Representative FPDs include liquid crystal displays (LCDs) and plasma display panels (PDPs).

LCDs are formed from a backlight mounted to the rear of a liquid crystal panel and a color filter mounted on a front surface of the liquid crystal panel, the panel becoming transparent when electricity is supplied. The widespread usage of LCDs in personal computers, televisions, and the like, is anticipated.

PDPs, on the other hand, are generally formed from two thin glass substrates on which are arranged a plurality of electrodes and dielectric films (or dielectric layers). The two glass substrates are arranged to face each other with a plurality of barrier ribs (hereafter "ribs") interposed between, and phosphor layers are arranged in the gap ("rib gap") between adjacent ribs. A space between the two glass substrates is filled with a discharge gas, and the substrates are sealed together such that the space therebetween is airtight. A phosphor illumination results from a discharge generated in the discharge gas when electricity is supplied. Unlike cathode-ray tube (CRT) displays, increases in PDP screen size result in only minimal increases in the depth and weight of the display unit, and PDPs are additionally noted for their unlimited viewing angle.

The current demand for increases in the screen size and image quality (resolution) of FPDs such as these has resulted in the availability on the market of PDPs having a screen size in excess of 50 inches.

However, moves are now being made to further increase the capacity of high resolution PDPs. For instance, current demands require high-vision PDPs to have 1920×1125 pixels, a 0.14 mm×0.45 mm cell pitch, and a per cell surface area of approximately 0.063 $mm^2$. A PDP realizing such a capacity would exhibit a much higher resolution than NTSC compatible PDPs currently in use. In order to achieve such a capacity it is necessary for the phosphor layers to be formed as minutely as they are for high-vision displays (i.e. a rib pitch in the order of 0.1 mm to 0.15 mm).

Unexamined patent application publication 10-192541 filed in Japan discloses an inkjet (linejet) method for this purpose, which allows phosphor ink to be discharged from a fine nozzle and applied in rib gaps between adjacent ribs.

FIG. 3 is a front cross-sectional view of a nozzle unit 800 and an ink tank 900 used in the disclosed inkjet method. Nozzle unit 800 is a hollow rectangular parallelepiped formed from SUS steel and includes a lid 801, a housing 802, and a soleplate 803.

Soleplate 803 is perforated with a plurality of nozzle holes 700 formed at a regular pitch (e.g. the pitch of the phosphor layers corresponding to any one of the colors red, green, and blue). A perforated valve opening V3 in lid 801 is connected via an Si tube L1 to a valve opening V2 in ink tank 900 which stores the phosphor ink. Compressed air supplied at a regular pressure (e.g. 4~5 $kg/cm^2$) through a valve opening V1 in the top of ink tank 900 forces the phosphor ink to run into nozzle unit 800, from where the ink is discharged from the plurality of nozzle holes 700.

However, as shown in FIG. 4A, discharging the phosphor ink according to the disclosed inkjet method often results in the ink flows from nozzle holes 700 reacting with each other due to electrostatic action, causing some of the ink flows to warp and thus preventing the vertically downward flow of the ink. Consequently, application of the ink on a target surface is impeded, and phosphor layers are formed in which the colors may be mixed and incorrect amounts of ink may be applied to given surface areas. The result is uneven brightness across the range of cells.

As seen above, there exists room for improvements in stability and accuracy with respect to methods for applying phosphor ink through an ink nozzle.

Moreover, problems of erroneous application due to electrostatic action can arise and need to be resolved with respect to not only phosphor ink but all the various types of ink applied in the formation of the layers of LCDs, PDPs, and other FPDs.

In view of the above issues, an object of the present invention is to provide an ink for a display panel, such as a phosphor ink, that can be applied efficiently and with precision. A further object of the present invention is to provide a method for manufacturing high quality plasma display panels using the ink.

DISCLOSURE OF THE INVENTION

To resolve these issues, an ink for a display panel is provided that at a time of application is a mixture of a powder material used in forming a structural layer of a display panel, a water-soluble resin included in a range of 1 wt % to 20 wt % inclusive of the ink, and a water-miscible solvent.

Inks conventionally used as inks for display panels (e.g. phosphor inks) are of organic composition, as typified by the ink disclosed in the prior art example cited above. In contrast, the ink of the present invention includes both a water-soluble resin and a water-miscible solvent, which allows the ink to retain a high moisture content at the time of application. The susceptibility of the ink to the occurrence of electrostatic action is thus greatly reduced in comparison with the conventional inks, and even when the ink is discharged though fine nozzle holes, for example, there is no warping of the ink flows caused by the ink flows reacting with each other. As a result, an efficient application process can be achieved in which the ink is discharged in a vertically downward direction.

The ink of the present invention may for example be a phosphor ink, an Ag electrode ink, a shading film (black matrix) ink or a white reflective layer ink, and may be used in forming structural layers (or films) of a display panel.

Furthermore, the water-soluble resin present in the ink may include a member selected from the group consisting of hydroxypropyl cellulose, hydroxyethyl cellulose, ethylhydroxyethyl cellulose, carboxymethyl cellulose, polyvinyl alcohol, and polyvinyl ether, and the resin may have a weight-average molecular weight in a range of 30,000 to 100,000 inclusive.

Furthermore, the water-miscible solvent present in the ink may include a member selected from the group consisting of ethylene glycol, ethylene glycol monoacetate, ethylene glycol monomethyl ether, ethylene glycol monoethyl ether, ethylene glycol monobutyl ether, ethylene glycol monomethyl ether acetate, 3-methoxy-3-methylbutanol, allylalcohol, isopropyl alcohol, ethanol, glycidol, tetrahydrofurfuryl alcohol, t-buthanol, furfuryl alcohol, propargyl alcohol, 1-propanol, methanol, 3-methyl-1-butyne-3-ore, 15-crown-5, 18-crown-6, propylene oxide, 1,4-dioxane, dipropyl ether, dimethyl ether, tetrahydrofuran, acetaldehyde, diacetone alcohol, methyl lactate, γ-butyl lactone, glycerin, glycerin-1,2-dimethyl ether, glycerin-1,3-dimethyl ether, glycerin-1-acetate, 2-chloro-1,3-propanediol, 3-chloro-1,2-propanediol, diethylene glycol, diethylene glycol ethyl methyl ether, diethylene glycol chlorohydrin, diethylene glycol diacetate, diethylene glycol diethyl ether, diethylene glycol dimethyl ether, diethylene glycol monomethyl ether, dipropylene glycol, dipropylene glycol monomethyl ether, and triethylene glycol.

Furthermore, a viscosity of the ink would preferably be in a range of $3 \times 10^{-1}$ Pa.s to 50 Pa.s inclusive at the time of application.

BEST MODE FOR CARRYING OUT THE INVENTION

1. Embodiment 1 (Relating to Application of a Phosphor Ink)

1-1. Structure of PDP 1

Figure 1:
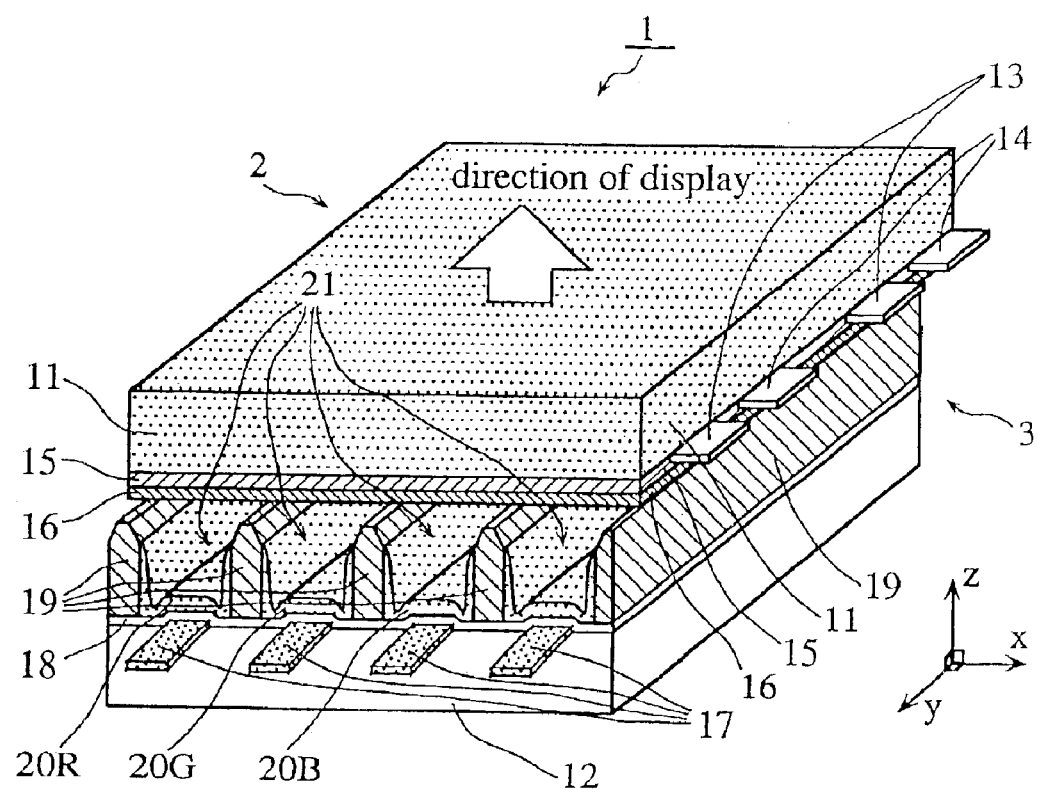
FIG. 1 shows a main section of a PDP according to an embodiment 1 of the present invention.
Figure 2:
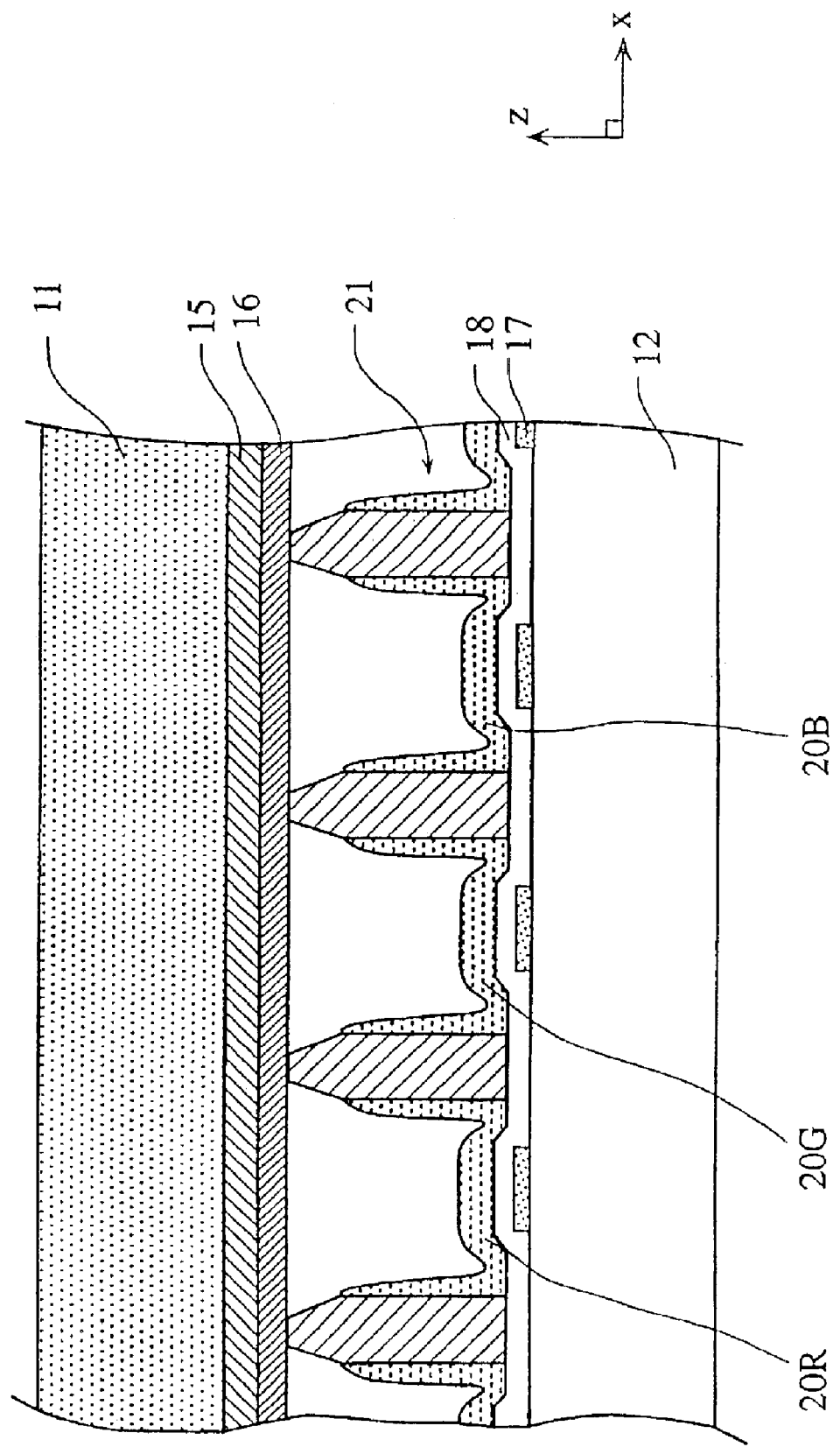
FIG. 2 is a partial cross-sectional view of the PDP in a thickness direction.

FIG. 1 is a partial cross-sectional perspective view of a main section of an AC surface-discharge plasma display panel 1 ("PDP 1") according to embodiment 1 of the present invention. In FIG. 1, a thickness of PDP 1 is in a z direction, and the panel surface of PDP 1 lies parallel to an xy plane. Here, PDP 1 is, for example, a NTSC compatible 42-inch PDP. The present invention may, however, be applied to PDPs of varying sizes and compatibilities.

The structure of PDP 1 as shown in FIG. 1 is divided broadly into a front panel 2 and a back panel 3 which are arranged to face each other.

Plural pairs of display electrodes 13 and 14 (X electrodes 14, Y electrodes 13) are arranged to extend across a principle surface of a front panel glass 11 that forms a substrate of front panel 2.

A dielectric layer 15 of approximately 30 $\mu$m in thickness and a protective layer 16 of approximately 1.0 $\mu$m in thickness are coated in the stated order over the entire surface of front panel glass 11 on which the display electrodes are arranged.

A plurality of address electrodes 17 extending in the y direction and of approximately 5 $\mu$m in thickness and 60 $\mu$m in width are arranged in a stripe pattern at regular intervals (e.g. 360 $\mu$m) in the x direction on a back panel glass 12 that forms a substrate of back panel 3. A dielectric film 18 of approximately 30 $\mu$m in thickness is coated, so as to cover address electrodes 17, over the entire surface of back panel glass 12 on which the address electrodes are arranged. Barrier ribs 19 (approx. 150 $\mu$m high and 40 $\mu$m wide; hereafter "ribs") are arranged on dielectric film 18 so a to be positioned in an area corresponding to the gap between adjacent address electrodes 17, and phosphor layers 20R, 20G, and 20B corresponding to the colors red (R), green (G), and blue (B), respectively, are formed in the gap ("rib gap") between adjacent ribs 19.

The front and back panels structured as described above are sealed together around their respective perimeters using glass frit such that display electrodes 13 and 14 extend in an orthogonal direction to address electrodes 17. The sealed space between the front and back panels is then filled at a predetermined pressure (generally in a range of 500~760 Torr inclusive) with a discharge gas formed from an inert gas such as He, Xe, and/or Ne.

Discharge spaces 21 lie between adjacent ribs 19, and each of the cells used in image display is defined by the area in which a single pair of discharge electrodes 13 and 14 extend across a single address electrode 17 with a discharge space 21 interposed therebetween. A cell pitch is 1080 $\mu$m in the x direction and 360 $\mu$m in the y direction.

1-2. Operation of PDP 1

To drive PDP 1, a panel driving unit (not shown in the drawings) applies pulses to address (i.e. scan) electrodes 17 and display electrodes 14 in order to conduct a write discharge (i.e. address discharge), after which sustain pulses are applied to each pair of display electrodes 13 and 14. The application of the sustain pulses initiates a sustain discharge, and image display is achieved as a result.

2. Manufacture of PDP 1

The following description relates to an exemplary manufacturing method for PDP 1.

2-1. Manufacture of a Front Panel

A plurality of display electrodes are formed on a surface of a front panel glass made from soda lime glass of approximately 2.6 mm in thickness. A metal material of which a main component is Ag, for example, may used to form Ag electrodes of approximately 4 $\mu$m in thickness on the front glass panel. Although a screen-printing method may be applied in the formation of the display electrodes when Ag is used, it is also possible to use a linejet method (described below).

Next, a lead glass paste is coated over an entire surface of the front panel glass at a thickness of approximately 15 $\mu$m to 45 $\mu$m, covering the display electrodes.

Next, a protective layer of approximately 0.3 $\mu$m to 0.6 $\mu$m in thickness is formed over the dielectric layer using such methods as an evaporation method or a chemical vapor deposition (CVD) method. Magnesium (MgO) is generally used in the manufacture of the protective layer, although when a different material such as alumina ($Al_2O_3$) is used in forming part of the protective layer, the layer may be patterned using a suitable metal mask.

Thus completes the manufacture of the front panel.

2-2. Manufacture of a Back Panel

Address electrodes of approximately 5 $\mu$m in thickness are formed on a surface of a back panel glass made from soda lime glass of approximately 2.6 mm in thickness by applying, in a regularly spaced stripe pattern, a dielectric material of which a main component is Ag, for example. Here, the manufacture of a 42-inch NTSC or VGA compatible PDP requires that the gap between adjacent address electrodes be less than or equal to 0.4 mm in width.

Next, a lead glass paste is applied at a thickness of approximately 20 $\mu$m to 30 $\mu$m across an entire surface of the back panel glass on which the address electrodes have been formed, and the applied paste is baked to form a dielectric film.

Next, the same lead glass material as used in the formation of the dielectric film is used to form a plurality of ribs of approximately 60 μm to 100 μm in height on the dielectric film, the ribs being positioned in an area corresponding to the gap between adjacent address electrodes. The ribs are formed, for example, by repeatedly screen-printing a paste that includes the glass material and then baking the screen-printed paste.

Once the ribs have been formed, phosphor ink that includes one of red (R), green (G), and blue (B) phosphors is applied on the sections of the dielectric film lying exposed between the ribs, and the applied phosphor ink is baked to form phosphor layers 20R, 20G, and 20B, respectively.

Here, a main characteristic of embodiment 1 relates to the method for manufacturing the phosphor layers. Whereas conventionally used oil-based (i.e. organic) phosphor inks include an organic solvent, the present invention relates to the manufacture of inks for display panels such as, for example, a water-soluble phosphor ink formed from phosphor particles, a water-soluble resin, and a water-miscible solvent. The composition of the water-soluble phosphor ink of the present invention has resulted from assiduous research conducted by the inventor. Moreover, the viscosity of the ink and the effective suppression of electrostatic action exhibited by the ink are qualities that have been adjusted specifically for use with application methods such as the linejet method. Specifically, the water-soluble phosphor ink of the present invention is characterized by the mixing together of phosphor particles, a water-soluble resin, and a water-miscible solvent. Furthermore, at the time of application, the viscosity of the ink is set in a range of $3 \times 10^{-1}$ Pa.s to 50 Pa.s inclusive (preferable 1~50 Pa.s), and the water-soluble resin is included in a range of 1 wt % to 20 wt % inclusive of the ink.

Although the viscosity of the ink may be other than that given above, in order to achieve an excellent application of the ink through the fine nozzle holes of application methods such as the linejet method, the viscosity of the ink should preferably be in the range given above.

First, the phosphor material is prepared. The following conventional materials may be used as the phosphors.

| | |
|---|---|
| Red phosphors: | $(Y_xGd_{1-x})BO_3:Eu^{3+}$ |
| Green phosphors: | $Zn_2SiO_4:Mn$ |
| Blue phosphors: | $BaMgAl_{10}O_{17}:Eu^{3+}$ (or $BaMgAl_{14}O_{23}:Eu^{3+}$) |

The phosphor material may, for example, be a powder having an average particle size of approximately 0.5 μm to 7 μm.

Next, the water-soluble resin is prepared. The water-soluble resin may include a member selected from the group consisting of hydroxypropyl cellulose, hydroxyethyl cellulose, ethylhydroxyethyl cellulose, carboxymethyl cellulose, polyvinyl alcohol, and polyvinyl ether, and the resin may have a weight-average molecular weight in a range of 30,000 to 100,000 inclusive.

Next, the water-miscible solvent is prepared. The water-miscible solvent may include a member selected from the group consisting of ethylene glycol, ethylene glycol monoacetate, ethylene glycol monomethyl ether, ethylene glycol monoethyl ether, ethylene glycol monobutyl ether, ethylene glycol monomethyl ether acetate, 3-methoxy-3-methylbutanol, allylalcohol, isopropyl alcohol, ethanol, glycidol, tetrahydrofurfuryl alcohol, t-buthanol, furfuryl alcohol, propargyl alcohol, 1-propanol, methanol, 3-methyl-1-butyne-3-ore, 15-crown-5, 18-crown-6, propylene oxide, 1,4-dioxane, dipropyl ether, dimethyl ether, tetrahydrofuran, acetaldehyde, diacetone alcohol, methyl lactate, γ-butyl lactone, glycerin, glycerin-1,2-dimethyl ether, glycerin-1,3-dimethyl ether, glycerin-1-acetate, 2-chloro-1,3-propanediol, 3-chloro-1,2-propanediol, diethylene glycol, diethylene glycol ethyl methyl ether, diethylene glycol chlorohydrin, diethylene glycol diacetate, diethylene glycol diethyl ether, diethylene glycol dimethyl ether, diethylene glycol monomethyl ether, dipropylene glycol, dipropylene glycol monomethyl ether, and triethylene glycol.

The above water-soluble resins and water-miscible solvents have been selected for the relative ease with which they can be acquired.

The water-soluble phosphor ink is manufactured by thoroughly mixing the various components of the ink using a dispersion device such as a three-roll mill, and then diluting the mixed components so as to achieve the preferred viscosity.

While a number of methods may be used in applying the water-soluble phosphor ink, the following description relates to the use of a linejet (i.e. inkjet) method. This method is effective in evenly applying the phosphor ink to exposed surfaces of the dielectric film between adjacent ribs and to the walls of ribs positioned at a fine pitch.

First, ink tank 900 and nozzle unit 800 are prepared. Ink tank 900 is filled with phosphor ink, and nozzle holes 700 of nozzle unit 800 are positioned between the evenly spaced ribs on the back panel. Nozzle unit 800 is then moved along the back panel in a lengthwise direction of the ribs in order to apply the water-soluble phosphor ink. A conventional XY table may be readily employed in this application process.

The reasons for using the water-soluble phosphor ink of embodiment 1 will now be described in detail.

2-3. Effects of the Water-soluble Phosphor Ink

Figure 3:
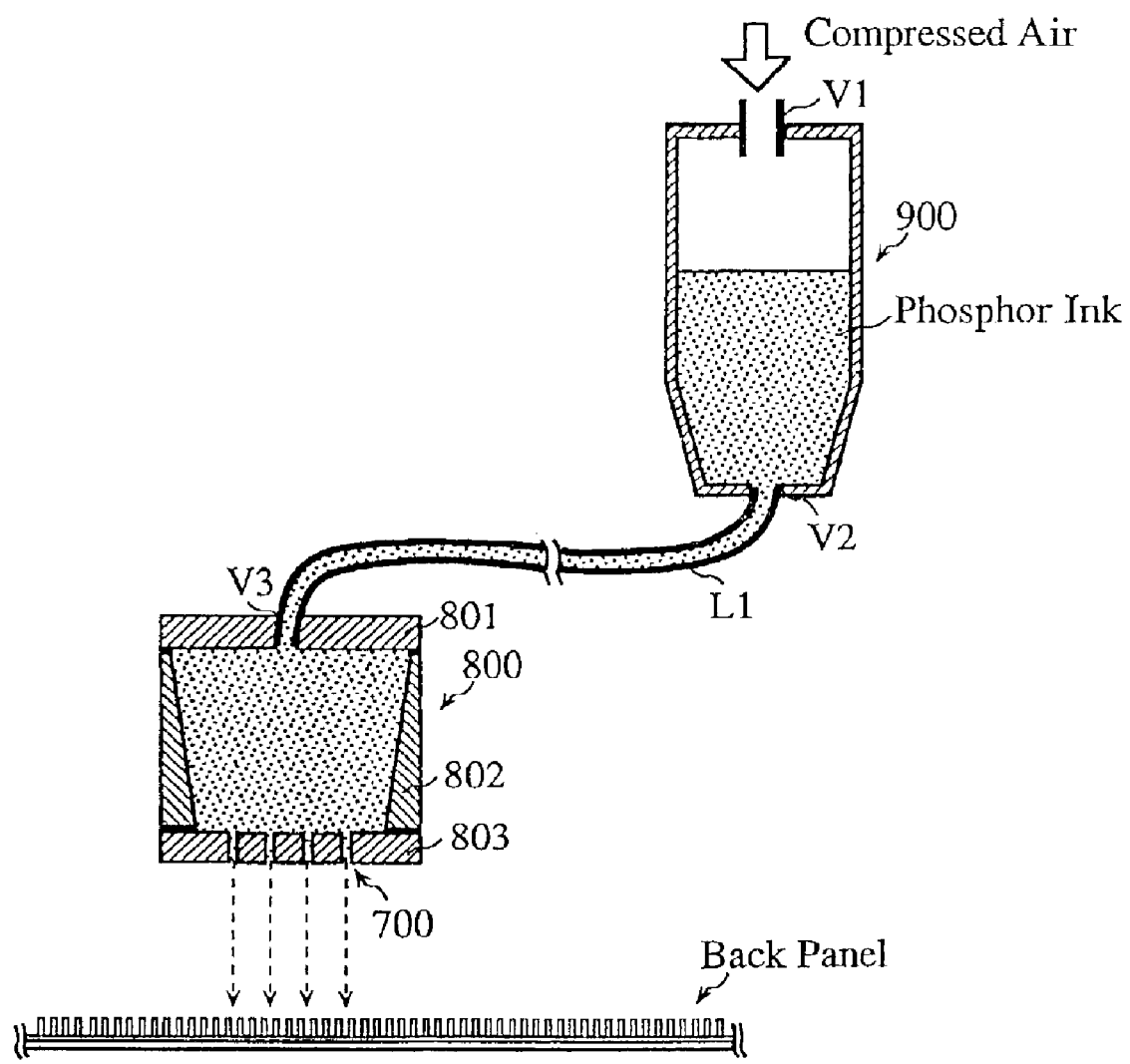
FIG. 3 is a front cross-sectional view of a nozzle unit and an ink tank.

Conventionally, the application of inks for display panels such as phosphor inks is achieved though the use of screen-printing, dye coating, and other methods. However, the recent demand for FPDs (particularly PDPs) that exhibit higher resolution capabilities has resulted in the need for methods capable of precisely and efficiently applying phosphor inks corresponding to the colors red (R), green (G), and blue (B) under increasingly demanding conditions. This situation has led to the development and usage of inkjet (i.e. linejet) methods (see FIG. 3) capable of discharging phosphor ink through fine nozzles into rib gaps between adjacent ribs, an exemplary method of which is disclosed in the above-mentioned unexamined patent application publication 10-192541 filed in Japan.

The inkjet method requires that a plurality of nozzle holes 700 be perforated in the bottom of nozzle unit 800 at a regular pitch (e.g. the pitch of phosphor layers corresponding to any one of the colors RGB). The phosphor ink is then discharged though nozzle holes 700 under pressure.

Figure 4A:
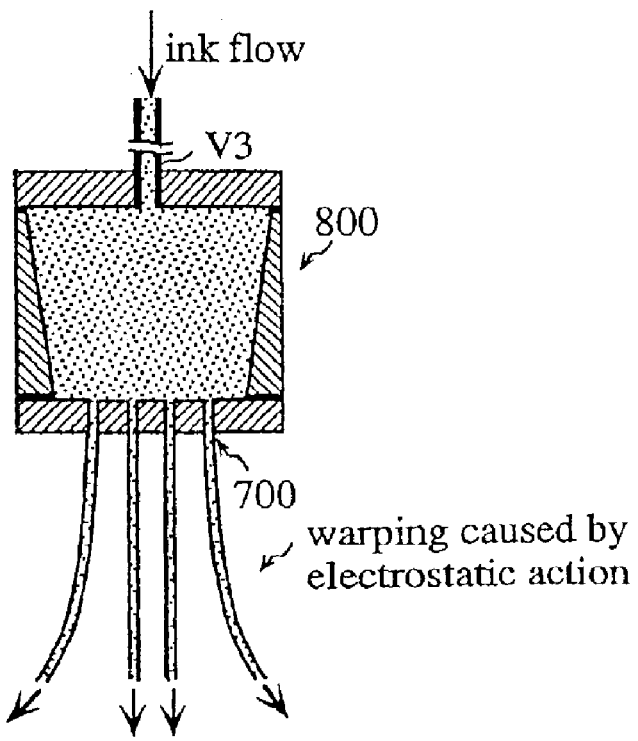
FIGS. 4A and 4B show ink flows discharged from the nozzle unit.

As shown in FIG. 4A, however, according to this method, the discharge of ink through nozzle holes 700 at high speed readily results in the occurrence of electrostatic action, which causes the plurality of ink flows to react with each other and become warped. Consequently, the discharged phosphor ink fails to flow in a vertically downward direction. Static electricity generated by the friction of the ink against nozzle holes 700 at the time of discharge is thought to cause the warping of the ink flows.

The occurrence of this problem renders the ink flows uncontrollable and the application of the ink on target surfaces becomes difficult to achieve. Mixing of the colors and the application of incorrect amounts of phosphor ink are typical consequences. This problem occurs with comparative frequency when conventional organic inks are used, and is in urgent need of resolving.

Figure 4B:
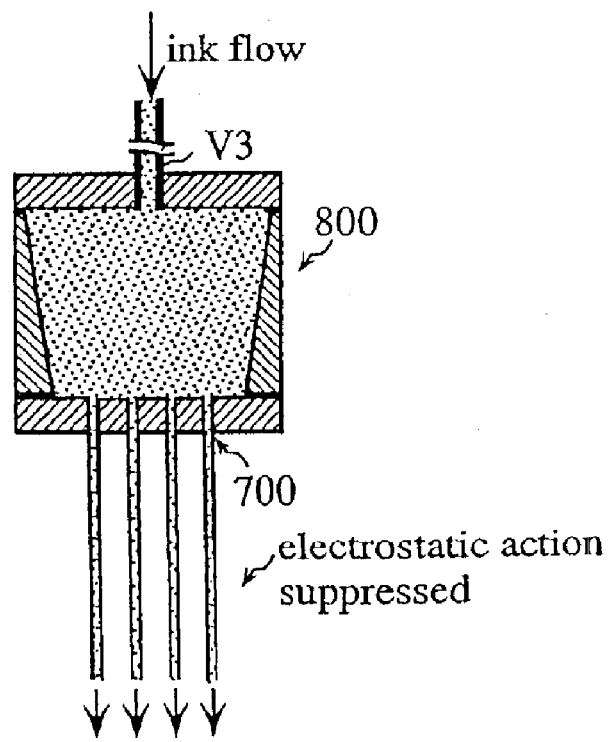

Embodiment 1 of the invention seeks to resolve this problem through the usage of a water-soluble phosphor ink. The inventor of the present invention has proven through experimentation that a water-soluble ink is less likely than an organic ink to result in electrostatic action. Thus, as shown in FIG. 4B, the usage of the water-soluble phosphor ink allows the warping of the discharged ink to be prevented and the vertically downward flow of the ink to be achieved, even when nozzle holes 700 are narrowly pitched. As described above, the optimal composition of the ink was also determined through experimentation. As a result, usage of the water-soluble phosphor ink of embodiment 1 allows for the effective formation of phosphor layers that avoids the mixing of colors and other related problems described above, even when the target surface on which the ink is to be applied is minimal in area.

Moreover, in addition to the above effects, the water-soluble phosphor ink of embodiment 1 exhibits excellent qualities in the washing process. The use of conventional organic phosphor inks requires that an organic solvent be used in the washing process, in connection with which remain problems relating to the safety and health of those handling the organic solvent, disposal of the waste liquid, and environmental concerns. In contrast, usage of the water-soluble phosphor ink of embodiment 1 requires the use of only water and a minimal amount of solvent in the washing process, which markedly improves the handling qualities of the ink in comparison to conventional organic inks, as well as helping to alleviate environmental concerns.

Moreover, collecting the expensive phosphor particles remaining after the washing process is easier and safer with the water-soluble phosphor ink than with conventional organic phosphor inks.

Once the application process relating to the water-soluble phosphor ink of embodiment 1 has been completed, the phosphor layers are formed by drying and baking the applied ink, thus completing the formation of the back panel.

Here, the front panel glass and back panel glass have been described as being formed from soda lime glass, although this was merely by way of example, and embodiment 1 allows for the use of other materials.

2-4. Completion of the PDP

A sealant glass material is applied to a perimeter of both the front and back panels where they are to contact with each other. The two panels are then fitted together and baked so as to effect their sealing. A high vacuum (approx. $1.1 \times 10^{-4}$ Pa) is then created in the discharge spaces existing between the sealed panels, and the discharge spaces are filled at a predetermined pressure ($2.7 \times 10^5$ Pa in the given example) with a discharge gas such as Ne—Xe, He—Ne—Xe, or He—Ne—Xe—Ar.

Moreover, experimentation has shown that luminous efficiency is improved when the pressure of the gas at the time of filling is in a range of $1.1 \times 10^5$ Pa to $5.3 \times 10^5$ Pa inclusive (see unexamined patent application publication 9-141954 filed in Japan).

3. Embodiment 2 (Relating to Application of an Ag Electrode Ink)

Here, an example is given of the ink of the present invention adapted as an Ag electrode ink for use in forming display electrodes 13 and 14 of PDP 1.

First, the Ag electrode ink is manufactured from an Ag powder having an average particle size in a range of 0.1 $\mu$m to 3 $\mu$m inclusive, glass frit having an average particle size in a range of 0.1 $\mu$m to 1 $\mu$m inclusive and being included in a range of 1 wt % to 20 wt % inclusive of the ink, and a water-miscible solvent. The ink thus manufactured is then applied at regular intervals (i.e. one pair of display electrodes 13, 14 for every cell pitch in a y direction) on the front panel using nozzle unit 800 and ink tank 900, for example.

The achievable effects according to this structure of the ink are the same as those described above in relation to the phosphor ink.

Formation of the Ag electrodes is completed by allowing the ink to air dry for a while after application and then baking the applied ink in a furnace.

The Ag electrode ink according to embodiment 2 may also be used in the formation of address electrodes and other electrodes.

4. Embodiment 3 (Relating to Application of a White Reflective Layer Ink)

Here, an example is given of the ink of the present invention adapted as a white reflective layer ink used in forming a white reflective layer of PDP 1. The white reflective layer is provided in order to achieve color balance with respect to phosphor layers having a comparatively low luminous efficiency (e.g. the red and blue layers). Thus, depending on the situation, white reflective layers may be provided for phosphor layers corresponding to no more than two of the colors RGB in order to achieve a suitable color balance (e.g. at least one of the red and blue phosphor layers).

The white reflective layer is formed as follows.

First, a white reflective layer ink is manufactured from white pigment (e.g. titanium oxide, barium nitride, phosphors, or alumina oxide) having an average particle size in a range of 0.05 $\mu$m to 2 $\mu$m inclusive, a water-soluble resin included in the ink in a range of 1 wt % to 20 wt % inclusive, and a water-miscible solvent. Preferably the viscosity of the ink at the time of application would be in a range of 1 Pa.s to 50 Pa.s inclusive. Nozzle unit 800 and ink tank 900 may then be used to apply the white reflective layer ink in the rib gap between a plurality of the ribs on the back panel prior to the application of the phosphor ink.

The achievable effects according to this structure of the ink are the same as those described above in relation to the phosphor ink.

5. Embodiment 4 (Relating to Application of a Shading Film Ink)

Here, an example is given of the ink of the present invention adapted as a shading film ink using in forming a shading film of PDP 1. Shading films (i.e. black matrixes) are provided between front glass panel 11 and display electrodes 13, 14. The black matrix is provided so as to increase image contrast when the PDP is driven.

The shading film (black matrix) ink is manufactured from black pigment (e.g. RuO, NiO, TiO, TiO—$Al_2O_3$, or iron oxide), a water-soluble resin included in the ink in a range of 1 wt % to 20 wt % inclusive, glass frit having an average particle size in a range of 0.1 $\mu$m to 1 $\mu$m inclusive, and a water-miscible solvent. The linejet method in conjunction with nozzle unit 800 and ink tank 900 may then be used to apply the ink thus manufactured to the surface of front panel glass 11 on which the display electrodes are to be formed. The Ag electrodes may then be layered over the shading film thus formed. The achievable effects according to this structure of the ink are substantially the same as those described above in relation to the phosphor ink.

6. Embodiment 5 (Relating to Application of a Sealant Glass Ink)

Here, an example is given of the ink of the present invention being adapted as a sealant glass ink using in sealing together the front and back panels. The sealant glass ink is manufactured from glass frit having an average particle size in a range of 0.1 μm to 3 μm inclusive, a water-soluble resin included in the ink in a range of 1 wt % to 20 wt % inclusive, and a water-miscible solvent. The ink thus manufactured may then be applied in a sealing process to areas of the front and back panels that are to contact when the two panels are sealed together. The achievable effects according to this structure of the ink are the same as those described above in relation to the phosphor ink.

7. Related Matters

The above embodiments are described in terms of the application of an ink of the present invention in the manufacture of a gas display panel (PDP). However, the ink of the present invention is also applicable, for example, in the manufacture of display panels such as liquid crystal displays (LCDs) and other flat panel displays (FPDs). In particular, the phosphor ink of the present invention may be adapted as a backlight ink for use in the manufacture of LCDs.

The display panel of the present invention is described in the above embodiments as being variously adapted as a phosphor ink, an Ag electrode ink, a shading film (black matrix) ink, a sealant glass ink, and a white reflective layer ink used in forming the layers of PDP 1. A basic composition of these inks preferably, at the time of application, is mixture of a powder material included at 1 wt % or greater of the ink, a water-soluble resin included at 20 wt % or less of the ink, and a water-miscible solvent.

Furthermore, the above embodiments were described in terms of the ink being applied using a linejet method, although the present invention is, of course, not limited to this method of application, and the ink may be applied or painted using other application methods.

What is claimed is:

1. An ink for a display panel that at a time of application comprises a mixture of:
   a powder material used in forming a structural layer display panel;
   a water-soluble cellulose included in a range of 1 wt % to 20 wt % inclusive of the ink includes a member selected from the group consisting of hydroxypropyl cellulose, hydroxyethyl cellulose, ethylhydroxyethyl cellulose, carboxymethyl cellulose, and has a weight-average molecular weight in a range of 30,000 to 100,000 inclusive; and
   a water-miscible solvent.

2. The ink according to claim 1, wherein
   the powder material includes phosphor particles having an average particle size in a range of 0.5 μm to 7 μm inclusive, and
   the ink is a phosphor ink.

3. The ink according to claim 1, wherein
   the powder material includes an Ag material having an average particle size in a range of 0.1 μm to 3 μm inclusive, and a glass frit material having an average particle size in a range of 0.1 μm to 1 μm inclusive, and
   the ink is an Ag electrode ink.

4. The ink according to claim 1, wherein
   the powder material includes a black pigment, and a glass frit material having an average particle size in a range of 0.1 μm to 1 μm inclusive, and
   the ink is a shading film ink.

5. The ink according to claim 4, wherein
   the black pigment includes a member selected from the group consisting of RuO, NiO, TiO, TiO—$Al_2O_3$, and iron oxide.

6. The ink according to claim 1, wherein
   the powder material includes a glass frit material having an average particle size in a range of 0.1 μm to 3 μm inclusive, and
   the ink is a sealant glass ink.

7. The ink according to claim 1, wherein
   the powder material includes white pigment having an average particle size in a range of 0.05 μm to 2 μm inclusive, and
   the ink is a white reflective layer ink.

8. The ink according to claim 7, wherein
   the white pigment includes a member selected from the group consisting of titanium oxide, barium nitride, phosphor material, and alumina oxide.

9. The ink according to claim 1, wherein
   the water-miscible solvent includes a member selected from the group consisting of ethylene glycol, ethylene glycol monoacetate, ethylene glycol monomethyl ether, ethylene glycol monoethyl ether, ethylene glycol monobutyl ether, ethylene glycol monomethyl ether acetate, 3-methoxy-3-methylbutanol, allylalcohol, isopropyl alcohol, ethanol, glycidol, tetrahydrofurfuryl alcohol, t-buthanol, furfuryl alcohol, propargyl alcohol, 1-propanol, methanol, 3-methyl-1-butyne-3-ore, 15-crown-5, 18-crown-6, propylene oxide, 1,4-dioxane, dipropyl ether, dimethyl ether, tetrahydrofuran, acetaldehyde, diacetone alcohol, methyl lactate, γ-butyl lactone, glycerin, glycerin-1,2-dimethyl ether, glycerin-1, 3-dimethyl ether, glycerin-1-acetate, 2-chloro-1, 3-propanediol, 3-chloro-1, 2-propanediol, diethylene glycol, diethylene glycol ethyl methyl ether, diethylene glycol chlorohydrin, diethylene glycol diacetate, diethylene glycol diethyl ether, diethylene glycol dimethyl ether, diethylene glycol monomethyl ether, dipropylene glycol, dipropylene glycol monomethyl ether, and triethylene glycol.

10. The ink according to claim 1, wherein a viscosity of the ink at the time of application is in a range of $3 \times 10^{-1}$ Pa.s to 50 Pa.s inclusive.

11. A manufacturing method for a plasma display panel that includes a substrate having a plurality of barrier ribs formed on a principle surface thereof, comprising the step of:
    applying a phosphor ink in a rib gap between adjacent barrier ribs, wherein
    the phosphor ink at a time of application is a mixture of a phosphor powder having an average particle size in a range of 0.5 μm to 7 μm inclusive, a water-soluble cellulose included in a range of 1 wt % to 20 wt % inclusive of the ink, and a water-miscible solvent, and
    a viscosity of the ink at the time of application is in a range of 1 Pa.s to 50 Pa.s inclusive.

12. A manufacturing method for a plasma display panel that includes a substrate having a plurality of barrier ribs formed on a principle surface thereof, comprising the steps of:
    applying a white reflective layer ink in a rib gap between adjacent barrier ribs; and
    applying a phosphor ink corresponding to one of the colors red, green, and blue in a rib gap between adjacent barrier ribs such that one color is applied per rib gap, wherein
    the white reflective layer ink at a time of application is a mixture of a white pigment having an average particle size in a range of 0.05 μm to 2 μm inclusive, a water-soluble resin included in a range of 1 wt % to 20 wt % inclusive of the ink, and a water-miscible solvent, and a viscosity of the white reflective layer ink at the time of application is in a range of 1 Pa.s to 50 Pa.s inclusive.

13. The method according to claim 12, wherein the white reflective ink is applied in rib gaps in which phosphor ink corresponding to no more than two of the colors red, green, and blue is to be applied.

14. A manufacturing method for a plasma display panel that includes a substrate, comprising the step of:

applying an Ag electrode ink to a predetermined area of a principle surface of the substrate, wherein the Ag electrode ink at a time of application is a mixture of a glass frit material having an average particle size in a range of 0.1 $\mu$m to 1 $\mu$m inclusive, a water-soluble cellulose included in a range of 1 wt % to 20 wt % inclusive of the ink, an Ag powder having an average particle size in a range of 0.1 $\mu$m to 3 $\mu$m inclusive, and a water-miscible solvent.

15. A manufacturing method for a plasma display panel that includes a substrate, comprising the steps of:

applying a shading film ink to a predetermined area of a principle surface of the substrate; and laminating an Ag electrode material on the applied shading film ink, wherein the shading film ink at a time of application is a mixture of a glass frit material having an average particle size in a range of 0.1 $\mu$m to 1 $\mu$m inclusive, a water-soluble resin included in a range of 1 wt % to 20 wt % inclusive of the ink, a black pigment, and a water-miscible solvent.

16. A manufacturing method for a plasma display panel that includes a first panel and a second panel, comprising the steps of:

applying a sealant glass ink to a predetermined area of the first panel; and sealing the first panel to the second panel, wherein the sealant glass ink at a time of application is a mixture of a glass frit material having an average particle size in a range of 0.1 $\mu$m to 3 $\mu$m inclusive, a water-soluble resin included in a range of 1 wt % to 20 wt % inclusive of the ink, and a water-miscible solvent.

17. The method according to claim 11, wherein the ink is applied using an inkjet method.

* * * * *